United States Patent

[11] 3,612,498

| [72] | Inventors | Otto Voigt<br>Am Plannenstiel 14,89;<br>Alois Steimer, Unterfelstr. 5, 8902<br>Goggingen b., both of Augsburg, Germany |
|---|---|---|
| [21] | Appl. No. | 864,403 |
| [22] | Filed | Oct. 7, 1969 |
| [45] | Patented | Oct. 12, 1971 |
| [32] | Priority | Oct. 7, 1968 |
| [33] | | Germany |
| [31] | | P 18 01 613.2 |

[54] APPARATUS FOR HEATING AND CONTROLLING KILN ATMOSPHERE
11 Claims, 6 Drawing Figs.

[52] U.S. Cl. .................................................. 263/28, 263/15 R
[51] Int. Cl. .................................................. F27b 9/00
[50] Field of Search ........................................... 263/15, 28; 158/27.4, DIG. 23

[56] References Cited
UNITED STATES PATENTS

| 1,504,656 | 8/1924 | Trinks ........................... | 263/15 A |
| 1,744,453 | 1/1930 | Dressler ......................... | 263/28 |
| 2,195,384 | 3/1940 | Zobel et al. ..................... | 158/27.4 |
| 3,050,811 | 8/1962 | De Bartolomeis ............. | 263/28 X |

*Primary Examiner*—John J. Camby
*Attorney*—Edwin E. Greigg

ABSTRACT: In the wall or ceiling of a furnace or kiln for the heat treatment of materials there is disposed at least one burner tube assembly which introduces a mixture of additional air and fluid fuel into the firing zone at supersonic speed; the blow nozzle of the burner is constructed as a Laval nozzle for supercritical pressure ratio.

APPARATUS FOR HEATING AND CONTROLLING KILN ATMOSPHERE

BACKGROUND OF THE INVENTION

This invention relates to an apparatus for heating and controlling the atmosphere flowing through a tunnel furnace or annular furnace adapted to perform heat treatments, such as firing of ceramics. The apparatus is of the type that comprises a tubular burner which is insertable in an opening of the furnace wall or ceiling and through which combustible gas or other fluid fuel is injected together with a noncombustible gas such as air or $CO_2$.

A tunnel furnace or an annular furnace may be compared to a regenerative heat exchanger having a moving storage mass formed of the material to be treated. The latter is heated in the heating zone by the furnace atmosphere flowing from the firing or combustion zone. The fired material transfers heat in the cooling zone to the furnace atmosphere entering at the discharge end of the furnace. Under ideal theoretical conditions, the ambient atmospheric air entering into a heat-insulated furnace at ambient temperatures, exits therefrom at the same temperature, so that only the heat quantity required for the endothermic combustion process (expelling of the chemically bound water and possibly sintering) and for the vaporization of the free water content of the mixture is supplied. Such an ideal process could be approximated only if the supply of heat, which takes place at temperatures of 900°–1,100°C., was not coupled with the introduction into the combustion atmosphere of materials that deteriorate the heat balance (as it is the case during the combustion of customary fuels such as gas, oil or coal). Because of the relatively simple furnace structure and the small cost of energy, the furnaces, particularly those adapted to make coarse ceramic articles, are operated today with the aforenamed fuels, the combustion of which, however, generates harmful materials, such as $SO_2$ and the like. This circumstance requires the maintenance of an exit temperature (above the dew point) which is substantially above the ambient temperature. Further, the fuels, particularly those of the fluid type, do not encounter in the hot, flowing, firing atmosphere the most favorable conditioning for readying them for combustion; these gases mix in an unsatisfactory manner with the furnace atmosphere so that an imperfect combustion with soot formation results.

In order to avoid the aforedescribed disadvantage, according to a known process regarding fluid fuels, the fuel-conditioning phase is displaced to a space which is separated from the combustion chamber and which, as a mixer tube or mixer crucible, is disposed in the charging hole of the furnace. The fuel, which may be atomized by utilizing the conduit pressure or which may be introduced substantially without any pressure, is, in the mixer tube, preponderantly vaporized under the effect of the furnace heat and is mixed with additional air quantities corresponding approximately to the entire air quantity required for combustion. The mixture is blown into the firing chamber as an instantaneously igniting stream. Since, however, the introduced heat, for the purpose of maintaining a constant temperature field, has to be distributed uniformly along the cross section of the furnace, it is necessary to arrange in the furnace ceiling a plurality of juxtaposed burners and to blow the mixed stream with a sufficiently powerful impulse, which is proportional to the product: mass x velocity of the gas, so that the jet permeates at least approximately the entire channel height. By mixing the ignited combustion gases with the furnace atmosphere according to the formula $$L_x \approx L_z(1+Cx/d),$$

there is obtained a conically shaped hot gas stream, so that the juxtaposed burners associated with a firing zone, form a hot gas screen controlling the furnace atmosphere flowing into the furnace through the discharge opening thereof. In the aforenoted formula, $L_x$ is the quantity of furnace atmosphere mixed turbulently with the entering stream at a distance $x$ from the discharge opening of the mixing tube; $L_z$ is the quantity of the entering gas, essentially the additional air quantity; $d$ is the diameter of the mixing tube opening and $C$ is a constant. It was found empirically that the optimal operation regarding fuel consumption and complete combustion may be achieved if the additional air quantities correspond approximately to those required for the combustion of the introduced fuel. This result was unexpected since—as it will be discussed in more detail hereinafter—according to the heat balance, the fuel requirement as compared with the direct injection of the fuel into the normal airstream (which itself is five to eight times more than what is required for the combustion) should have increased proportionately to the additional air quantities. This advantageous result may be explained by a better dressing or conditioning of the fluid fuel and an improved mixing that more than compensate for the losses caused by the injection of the cold additional air. In tunnel kilns in which the quantity of the furnace atmosphere as gaseous heat carrier is excessive, a decrease of the fuel consumption may be achieved by means of the mixing tube process as opposed to the direct injection process. This, in turn, may be explained by the throttle effect of the aforenoted hot gas screen upon the stream of the normal air in the cooling zone which, because of the damming, may regeneratively take up more heat from the fired material.

Nevertheless, in known mixing tube processes there still remains a certain loss due to the injection of additional air of low enthalpy as compared with the normal inflowing air. Further, impurities such as oil coke and other deposits, particularly in heavy oil-operated kilns, may not be entirely avoided during the conditioning and mixing inside the mixer tube. Consequently, a continuous supervision and frequent maintenance of these apparatuses are necessary.

It is further to be noted that even in the known gas-fired tunnel and annular furnaces, the fuel gas has to be mixed with additional air before injection in order to achieve—by virtue of turbulence—a better distribution of the gas particles in the combustion chamber.

OBJECT, SUMMARY AND ADVANTAGES OF THE INVENTION

It is an object of the invention to provide an apparatus associated particularly with tunnel and annular kilns for improving the caloric efficiency of such furnaces by decreasing the fuel combustion in ensuring, inside the firing zone, the most favorable conditions, on the one hand, for the conditioning of fuels, particularly of the fluid type, such as heavy oil and coal dust and coal-water suspensions, and the mixing thereof with additional air and, on the other hand, for flow control of the kiln atmosphere.

Briefly stated, according to the invention, there is disposed in the furnace wall or ceiling, for the heating and control of the furnace atmosphere, at least one blow nozzle for the gaseous medium, being laid out for supercritical pressure ratio. In this manner, there is obtained not only a decrease in the fuel consumption, but also, the impulse of the gas stream, flowing with at least the speed of sound, upon the gas mass prevailing in the firing zone will be substantially larger, so that one or two burners per firing zone will be sufficient instead of the three to four burners used heretofore. The entire firing system of such furnaces is, by the reduction of the burners to one-half or one-third the original number, substantially simplified in structure and thus, also, the probability of malfunction is reduced. Further, the powerful jet impulse permits to arrange the burners not only in the charging holes of the furnace ceiling but also—as known by itself—in the sidewalls thereof. By arranging these burners in an alternating manner, a meandering stream may be achieved similarly to a zigzag kiln.

Further significant advantages may be achieved by disposing within the supersonic nozzle coaxially therewith a conduit tube, the outlet opening of which lies in the range of superexpansion and the inlet opening of which is connected with a channel which, in turn, communicates with the heating zone or cooling zone of the furnace. In this manner it is possible to draw the hot flue gases from the heating zone without hot gas fans and to introduce them in that range of the firing zone where substantial excess of air prevails. In the known tunnel and annular kilns without means for recirculating flue gases, such excess is five to eight times the air quantity ($\lambda$=5–8) required for the combustion of the introduced fuel. Losses due to the escaping furnace atmosphere are correspondingly high: they may amount to as much as 60 percent of the entire heat generated by the fuel. Such losses may be maintained at their smallest value if, after heating the furnace to firing temperatures, only so much additional fresh air is introduced that is required for the combustion of the fuel in the firing zone in order to satisfy the heat quantity requirements and to compensate for the unavoidable heat losses due to heat conduction and radiation. The remaining part of the flue gases that function merely as a heat carrier for the heat exchange are reintroduced into the cooling zone. In this manner not only the caloric efficiency of a tunnel or annular furnace is substantially improved, but also a "softer" neutral firing atmosphere is obtained, having less oxygen which otherwise often leads to unsightly deposits and discolorations on the fired articles.

The range of overexpansion of the jet downstream of the outlet opening of the aforenoted supersonic nozzle creates further an advantageous conditioning zone for fluid fuels such as heating oil, heavy oil, mazut, coal dust, coal dust-water-suspensions and the like. The vacuum that prevails there under intense radiation heat provides for the vaporization and gasification of these fuels which—after their conversion into gaseous form—are aerodynamically screened by means of Mach-lines and therefore may not be carried away by the natural atmospheric stream. The subsequent condensation or X-impact has, because of the intense radiation heat, no harmful effects. The strong impulse of the air flowing through the supersonic nozzle, provides for the greatest possible distribution of the fuel molecules over the entire furnace cross section. In case of fuels of high boiling point, the gasification process may be further improved by arranging the fuel conduit inside the aforedescribed tube carrying the hot gases.

The invention will be better understood as well as further objects and advantages will become more apparent from the ensuing detailed specification of several exemplary embodiments taken in conjunction with the drawing.

DESCRIPTION OF THE EMBODIMENTS

Figure 1:
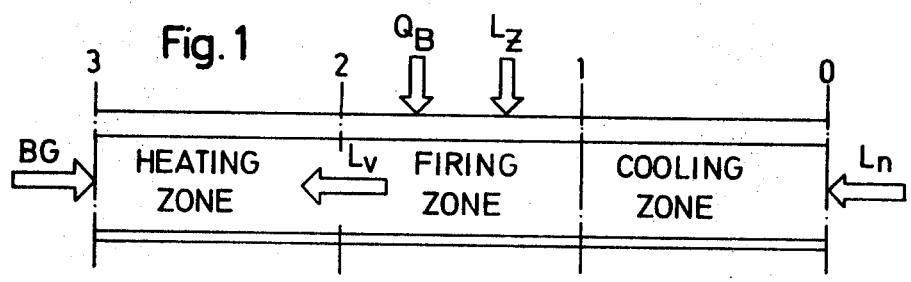
FIG. 1 is a schematic sectional side elevational view of a tunnel kiln.

Turning now to the diagrammatic FIG. 1, there is schematically shown a tunnel kiln in side elevational section, divided, as indicated by vertical lines 0, 1, 2 and 3, into a heating zone (2–3), a firing zone (1–2) and a cooling zone (0–1).

The material BG to be heat treated is introduced at 3 and advanced to the right. The furnace atmosphere (normal air) $L_n$ enters the kiln at 0 and flows leftward. The additional air $L_Z$ and the fuel heat $Q_B$ are introduced into the heat treatment or firing zone. The material BG, after heat treatment in the firing zone 1–2, transfers part of its heat in the cooling zone 0–1 to the furnace atmosphere $L_n$. The latter is mixed in the firing zone 1–2 with additional air $L_Z$ and is maintained at combustion temperatures by means of the fuel heat $Q_B$. The flue gases $L_V$ leave the firing zone flowing leftward and after preheating the material BG in heating zone 2–3, exit from the tunnel kiln at 3.

Considering first a furnace operation without the introduction of additional air, the heat balance $$Q_B = L_V \cdot i_2 - L_n \cdot i_1,$$

or, since $L_V = L_n$ $$Q_B = L_n (i_2 - i_1),$$

Wherein $i_1$ is the specific enthalpy of air at location 1 and $i_2$ is the specific enthalpy of the flue gases at location 2. In case additional air $L_z$ is present, then $L_n = L_V - L_Z$ and thus $$Q_B = L_V \cdot i_2 - (L_V - L_Z) i_1 - L_Z \left( i_Z + \frac{H_{ad}}{\eta_{iad}} \right),$$

or $$Q_B = L_V (i_2 - i_1) + L_Z \left( i_1 - i_Z - \frac{H_{ad}}{\eta_{iad}} \right)$$

wherein $H_{ad}$ is the adiabatic pressure head and $\eta_{iad}$ is the inner adiabatic efficiency of the compressor for the additional air.

It follows unequivocally from the last-cited equation, that if the additional air $L_Z$ is increased, the fuel consumption $Q_B$ also increases.

Figure 2:
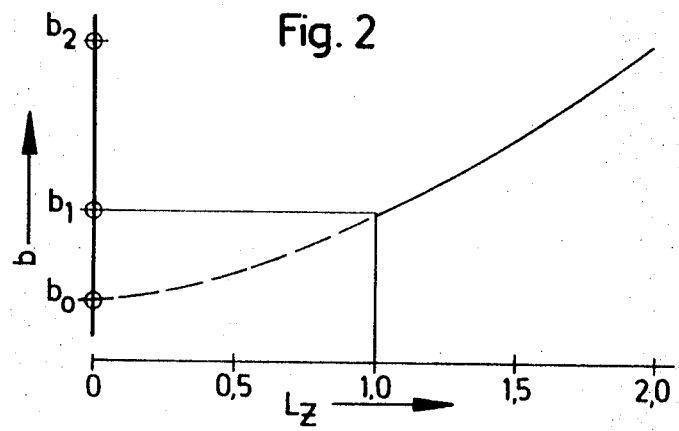
FIG. 2 is a diagram illustrating the fuel consumption as a function of the additional air quantities.

Turning now to the diagram of FIG. 2, the ordinate indicates the fuel consumption $b$, while the abscissa indicates the additional air quantities $L_z$. The value $L_z$=1 corresponds to the full combustion air quantity (stoichiometrical ratio). Between the values $L_z$=1 and $L_z$=2, several $b$-values were measured during actual operation. The values found are represented by the solid line portion of the graph in FIG. 2. Since in mixing tube-type burners, for the purpose of maintaining a constant temperature field, the quantity $L_z$ must not be substantially below 1, the lower portion of the curve (broken line) was calculated, rather than measured, down to the value $L_z$=0. The latter value thus gives the theoretical fuel consumption $b_0$ without additional air, that is, where the liquid fuel is directly injected into the furnace atmosphere. It has been found in practice that the fuel consumption $b_1$ for an additional air quantity $L_z$=1 is in general not greater than in case of a direct injection of fuel ($L_z$=0) and that in some furnaces the injection of colder additional air may even cause a decrease of the fuel consumption. The additional fuel consumption as compared to the theoretical minimum fuel quantity $b_0$ arises because the fuel injected or dispersed into the hot furnace atmosphere burns with poor efficiency due to its insufficient readying or conditioning and improper mixing. The losses $b_1 - b_0$ are approximately 16 percent of the effective fuel consumption. Although in the mixing tube process there arises, due to the introduction of colder additional air, an approximately similar additional fuel consumption, the efficiency of combustion is improved: the ware is burned more evenly and the flue gases are soot-free so that they may be subsequently used for drying purposes. If the furnace air quantity $L_n$ for the heat exchange is excessive, then its specific enthalpy $i_1$ upon entering the firing zone at 1 (FIG. 1) is smaller and consequently, in case of a direct injection, an additional fuel quantity $b_2 - b_1$ is required to attain the required firing temperatures. But, with the aid of the hot gas screen generated according to the mixing tube process, the airstream is throttled in the cooling zone 0 –1, so that the decreased air quantity $L_n$ is fully heated by the heat-treated hot material BG and the fuel consumption is lowered to $b_1$.

This invention thus seeks not only to approximate more closely the theoretical minimal fuel consumption $b_0$ for direct injection, but even attempts to achieve a value that is less than $b_0$. By dimensioning the injection nozzle, according to the invention, for supercritical pressure ratio, in the first place a greater aerodynamical impulse is generated with a smaller additional air quantity $L_z$. Consequently, as it follows from the last-cited equation, $Q_B$ will also decrease. The increased compression of the additional air does not imply any loss, since the value $H_{ad}/\eta_{ind}$ lowers the fuel consumption.

If the additional air is taken out from the furnace shell and heated by means of radiation heat, then $i_z$ will increase and thus $Q_B$ will be further decreased. If in addition, the vacuum prevailing in the range of superexpansion is used for drawing and blowing flue gases or cooling air from the heating or cooling zone respectively, then the fuel consumption is reduced by the heat content of these gas quantities, so that the ideal operation is much better approximated.

Figure 3:
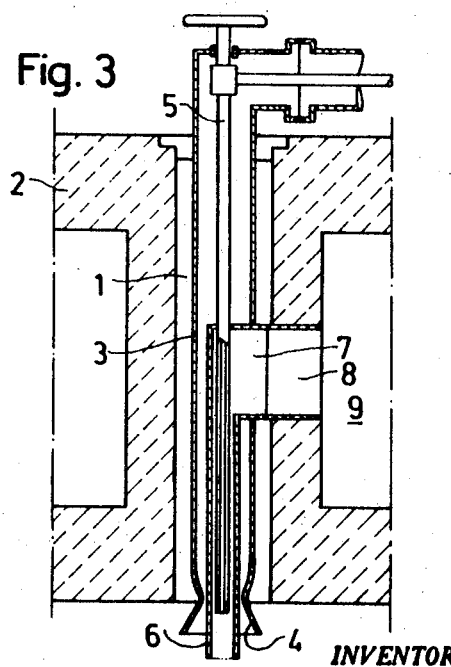
FIG. 3 is a side elevational view of a burner assembly disposed in a charging hole of a furnace and including a nozzle structure according to the invention.

Turning now to FIG. 3, there is shown a device according to the invention for the introduction of fluid fuel into the furnace. The device is disposed in the charging hole 1 provided in the ceiling 2 of a tunnel kiln not shown in detail. The device comprises a tube 3 which carries the additional air $L_z$ and which terminates in the firing zone of the furnace by a blow nozzle 4 constructed as a Laval nozzle for supercritical pressure ratio. Inside tube 3 there is coaxially disposed a fuel-carrying pipe 5 at the end of which there may be arranged a fuel atomizer (not shown) taking advantage of the pressure in the pipe 5. In case of fuel feed without pressure, it is advisable to thoroughly vaporize the fluid fuel in advance. For this purpose, the fuel conduit 5 is coaxially arranged in a tube 6 projecting beyond the nozzle 4. The outlet opening of the tube 6 is disposed in the area of superexpansion of the air jet. At its other end, the tube 6 is provided with a nipple 7 which, in turn, communicates through a port 8 with a channel 9 guiding the hot gases. The vacuum generated in the range of superexpansion draws gases of higher temperature (such as the flue gases from the heating zone or hot air from the cooling zone or channels of the furnace), so that the fuel, while flowing through tube 5, is heated and vaporized. Simultaneously, the heat taken from the furnace is reintroduced into the firing zone by means of tube 6.

Figure 4:
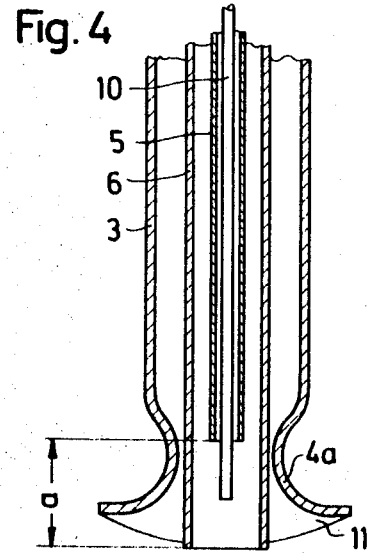
FIG. 4 is a fragmentary axial sectional view of a burner assembly including another nozzle structure according to the invention.

Turning now to FIG. 4, it is seen that the air tube 3 terminates in an outwardly flaring nozzle 4a which has an angle of divergence of approximately 180° in the drawing plane and about 90° in a plane vertical thereto, and which is oriented normal to the direction of flow of the kiln atmosphere. Inside the fuel conduit 5 there is axially disposed a rod 10, the lower end of which projects beyond the terminus of tube 5. The oil film accumulating on rod 10 is carried away—insomuch as it is not vaporized—by the warm or hot gases passing through the tube 6 and is atomized and gasified in the turbulent flow, while vaporization is performed by vacuum prevailing in the range of superexpansion. The distance $a$ between the outlet openings of the tubes 5 and 6 is preferably so selected that within these tubes no fuel residue or oil coke may be deposited. The rod 10 may further be so designed as to be adapted to knock loose such deposits.

Figure 5:
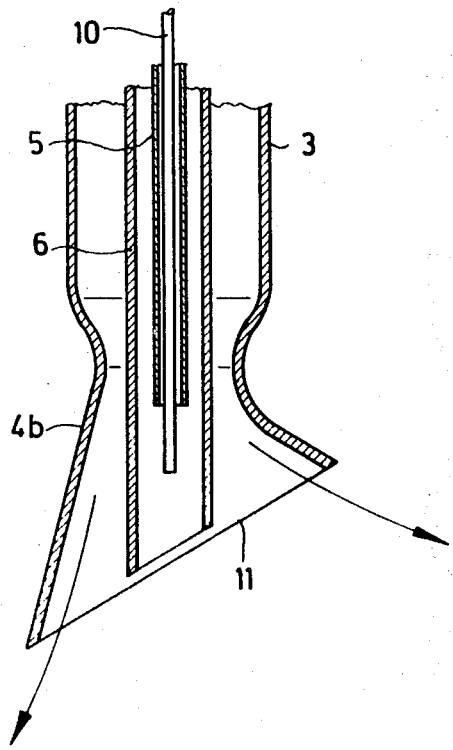
FIG. 5 is a fragmentary axial sectional view of a burner assembly including still another nozzle structure according to the invention and FIG. 6 is a cross-sectional schematic view of a tunnel furnace with various alternatively or jointly used burner assemblies according to the invention.

The air tube 3 of the burner assembly depicted in FIG. 5 is provided with a nozzle 4b which has an outlet opening 11, the plane of which is inclined with respect to the axis of tube 3. In this manner a greater subpressure may be generated in the range of superexpansion.

Figure 6:
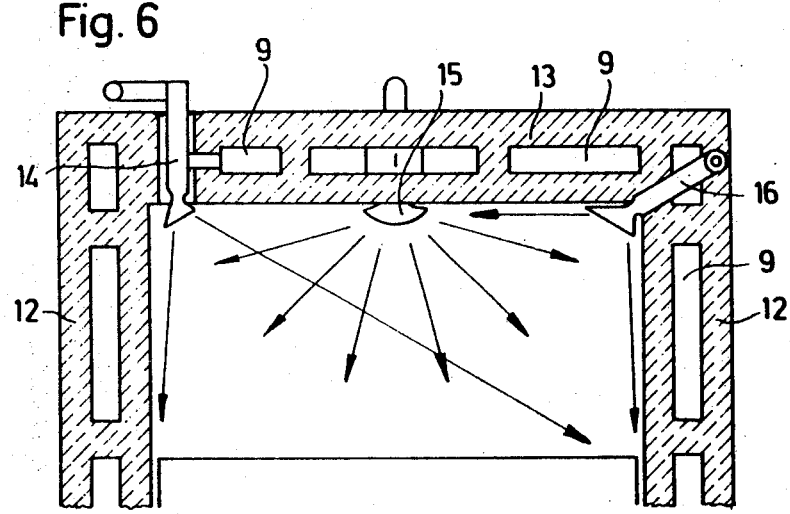

FIG. 6 illustrates several possibilities of arranging burners according to the invention in the firing chamber of a tunnel kiln defined by sidewalls 12 and ceiling 13 and provided with channels 9 through which cooling air or flue gases may be guided.

The burner 14 corresponds in structure and arrangement to that shown in FIG. 3, while its nozzle is slanted as depicted in FIG. 5. This burner structure is thus adapted to be mounted subsequently in the charging holes of existing kilns. While three or four burners of the conventional mixing tube type are required per firing zone, one or two burners built according to the invention suffice. The latter may be arranged from firing zone to firing zone in an alternating, asymmetrical manner or, as in the case of burner 15, which in structure corresponds to that shown in FIG. 4, may be disposed symmetrically in the furnace ceiling.

It has to be noted, however, that charging holes decrease the effective supporting section of the furnace ceiling, resulting in a more complex and costlier ceiling structure. Also, charging holes contribute to heat losses. Because of the powerful jet impulse generated by the burners according to the invention, the latter may be disposed in a sidewall of the furnace and still operate with the same efficiency. Burner 16 is arranged in such an exemplary manner.

The position of the outlet opening of the nozzle, whether inclined or normal to the burner axis, and its cross section, whether circular, elliptical or angular, is selected according to the height position of the burner. The outlet opening of the nozzle is designed advantageously in such a manner that the injected mixed jet impinges upon a possibly large surface of the furnace atmosphere and forces the latter in the direction of the jet flow.

It is also an advantage of the invention that the higher air pressure required for operation of a nozzle, which is laid out for supercritical pressure ratio, permits a substantial reduction of the cross section of conduits in case smaller air volumes are used. Thus, also the air or gas conduits may be arranged in the kiln masonry whereby the fuel conduits—as known in itself—may be disposed within the gas conduits.

We claim:

1. In a kiln, particularly a tunnel kiln for the firing of bricks and other ceramic products, including an apparatus for heating and controlling atmospheric air flowing therethrough for the heat treatment of said products, said kiln having heating, firing and cooling zones, said apparatus being of the type that is formed of tubular burner means disposed in a wall or ceiling of said kiln and adapted to inject, into the firing zone thereof, a mixture of a fluid fuel ingredient and a noncombustible gas ingredient in a jet, the improvement in said tubular burner means comprising, a. a first tube carrying one of said ingredients and having an open downstream end, b. a blow nozzle forming said open downstream end and being laid out for supercritical pressure ratio thereby defining a space by Mach-lines in the interior of said kiln, said space being screened from the flow of atmospheric air by said Mach-lines and c. a second tube carrying the other of said ingredients and having an outlet opening disposed in said space for introducing said other ingredient into said space.

2. An improvement as defined in claim 1 wherein said blow nozzle is of the Laval type.

3. An improvement as defined in claim 2, wherein the plane of the opening of said blow nozzle is inclined with respect to the axis thereof.

4. An improvement as defined in claim 2, wherein the flaring or diverging portion of said blow nozzle defines an angle from 90° to 180°.

5. An improvement as defined in claim 1, wherein said second tube extends within said first tube and its' outlet opening is disposed in the range of superexpansion of the jet emitted by said blow nozzle.

6. An improvement as defined in claim 5, wherein said second tube, upstream of its outlet opening communicates with at least one of said zones except the firing zone, for introducing into the latter hot gases taken from said furnace.

7. An improvement as defined in claim 5, including a third tube extending axially within said second tube and adapted to introduce fluid fuel into said firing zone.

8. An improvement as defined in claim 5, wherein the walls of said furnace are provided with channels for guiding hot gases, said second tube is connected directly with one of said channels to introduce said hot gases into said firing zone.

9. In a method of injecting into the interior of a kiln, particularly a tunnel kiln for the firing of bricks and other ceramic products, a jet formed of a mixture of a fluid fuel ingredient and a noncombustible gas ingredient, said kiln having heating, firing and cooling zones through which atmospheric air flows, the improvement comprising the following simultaneous steps:

a. introducing into said firing zone through a blow nozzle laid out for supercritical pressure ratio one of said ingredients as a stream having at least the speed of sound,
b. generating Mach-lines in the interior of said kiln by virtue of the cooperation of said last-named stream and said blow nozzle; said Mach-lines define a space in said kiln and screen said space from said atmospheric air and
c. introducing the other of said ingredients into the space defined by said Mach-lines.

10. A method as defined in claim 9, wherein step (C) includes the introduction of said other ingredient into said space inside and codirectionally with said stream.

11. A method as defined in claim 10, wherein said other ingredient is fluid fuel.